United States Patent [19]

Müller-Stute et al.

[11] Patent Number: 4,929,053

[45] Date of Patent: May 29, 1990

[54] DISPLAY UNIT AND OPTICAL WAVEGUIDE FOR USE IN SAME

[75] Inventors: Friedrich Müller-Stute, Neumünster; Günter Weil, Asslar, both of Fed. Rep. of Germany

[73] Assignee: U.S. Philips Corporation, New York, N.Y.

[21] Appl. No.: 301,004

[22] Filed: Jan. 23, 1989

[30] Foreign Application Priority Data

Feb. 1, 1988 [DE] Fed. Rep. of Germany ....... 3802868

[51] Int. Cl.$^5$ .......................... G02B 6/00; H05B 33/00
[52] U.S. Cl. ................. 350/96.34; 350/96.10; 250/484.1
[58] Field of Search ............... 350/96.10, 96.12, 96.15, 350/96.24, 96.25, 96.29, 96.30, 96.34; 250/458.1, 462.1, 463.1, 484.1, 487.1; 362/32; 340/700, 752, 760

[56] References Cited

U.S. PATENT DOCUMENTS

| 4,149,902 | 4/1979 | Mauer et al. | 250/458.1 |
| 4,227,939 | 10/1980 | Zewail et al. | 350/96.34 X |
| 4,257,676 | 3/1981 | Greubel et al. | 350/96.34 |
| 4,371,897 | 2/1983 | Kramer | 250/458.1 |
| 4,377,750 | 3/1983 | Pape et al. | 250/458.1 |
| 4,733,929 | 3/1988 | Brown | 350/96.15 |
| 4,799,748 | 1/1989 | Brown | 350/96.34 X |

Primary Examiner—William L. Sikes
Assistant Examiner—Brian M. Healy
Attorney, Agent, or Firm—Norman N. Spain

[57] ABSTRACT

The display unit comprises an optical waveguide (3) which is made of polycarbonate with admixtures of titanium dioxide and at least one fluorescent, light-converting organic dye. This achieves a uniform brightness distribution.

4 Claims, 1 Drawing Sheet

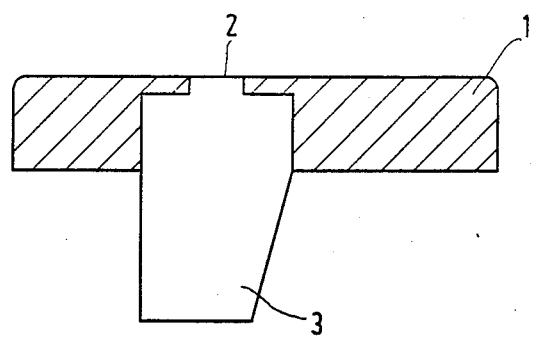

DISPLAY UNIT AND OPTICAL WAVEGUIDE FOR USE IN SAME

BACKGROUND OF THE INVENTION

The invention relates to a display unit comprising an optical waveguide.

Display units of this type are used in technical devices, for example radio receivers (DE-PS No. 905 488, DE-PS No. 944 739, DE-AS No. 23 27 924), motor car control or operating members (DE-AS No. 21 44 588, DE-OS No. 29 37 041, DE-OS No. 37 04 574), clocks (DE-OS No. 33 13 463) and electric household appliances such as electric cookers, washing machines and dish washers (DE-OS No. 36 03 324), the optical waveguides usually being made of a synthetic resin material. The optical waveguide may optionally conduct coloured light (DE-PS No. 944 739) or it is made of a light-collecting and light-conducting material, preferably containing a fluorescent dye (DE-PS No. 36 03 324).

Fluorescent dyes having light-collecting and light-converting properties are disclosed in inter alia the DE-OS No. 28 51 513, 30 01 857, 30 16 765 and 32 35 526 and the EP-PS No. 81 766 (perylene derivatives), the DE-PS No. 25 136 and 32 670 (cumarin derivatives) and the EP-OS No. 32 373, 46 861 and 73 007 (further organic compounds). In the DE-OS No. 28 51 513 and in the DE-PS No. 81 766 reference is made to the DE-AS No. 24 51 781 and/or 24 51 782, according to which the perylene derivatives are suitable for dying polystyrene, polyacrylate or polycarbonate in the mass, wherein for example 0.1 part of the dye is mixed with 100 parts of milled polystyrolblock polymerisate and 1 part of titanium dioxide. Subsequently the mixture is subjected to a further treatment, for example in a mixed salt unit or in a melting furnace.

SUMMARY OF THE INVENTION

A principal object of invention has is to provide a display unit having a uniform brightness distribution.

According to the invention this object is accomplished, in that the optical waveguide of the display unit is made of polycarbonate which contains a quantity of titanium dioxide sufficiently high to disperse the transmitted light but less than a quantity at which no light is transmitted anymore and at least a fluorescent, light converting organic dye.

BRIEF DESCRIPTION OF THE DRAWING

The sole FIGURE in the drawing is a cross-sectional view of a display unit according to the invention.

DETAILED DESCRIPTION OF THE INVENTION

The admixture of titanium dioxide is preferably 0.0025 to 0.03% by weight of the polycarbonate.

The admixture of dye is preferably 0.0025 to 0.03% by weight of the polycarbonate.

The invention will now be described in greater detail by way of example with reference to the accompanying drawing and an examples.

The sole FIGURE is a cross-sectional view of a display unit. The FIGURE shows a basic member 1 which is to display a symbol 2. An optical waveguide 3 of the said composition is inserted in a recessed portion of the basic member.

EXAMPLE 1

100 grs of polycarbonate (of the crystal-clear type) are mixed with 0.01% by weight of $TiO_2$ (white pigment CL 305 of Kronos-Titan) and 0.01% by weight of the dye Lumogen F orange 240, a dye of the perylene type (manufacturer: BASF) and made into an optical waveguide.

EXAMPLE 2

100 grs of polycarbonate (of the crystal-clear type) were mixed with 0.01% by weight of $TiO_2$ (white pigment CL 305 of Kronos-Titan) and 0.01% by weight of the dye Lumogen F red 300, a dye of the perylene type (manufacturer: BASF) and worked into an optical waveguide.

We claim:

1. An optical waveguide formed of a material consisting essentially of a polycarbonate, a quantity of titanium dioxide sufficient to disperse transmitted light but less than that at which no light is transmitted and a fluorescent, light-converting organic dye.

2. A display unit comprising an optical waveguide (3), said waveguide being formed of a material consisting essentially of a polycarbonate, titanium dioxide in an amount sufficiently high to disperse transmitted light but less than a quantity at which no light is transmitted and a fluorescent, light-converting organic dye.

3. A display unit comprising an optical waveguide (3), said waveguide being formed of a material consisting essentially of a polycarbonate, titanium dioxide in an amount of 0.0025 to 0.03% based on the weight of the polycarbonate and a fluorescent, light-converting organic dye.

4. A display unit of claim 3 wherein the material contains 0.0025 to 0.03% of the dye based on the weight of the polycarbonate.

* * * * *